(12) United States Patent
Sayama

(10) Patent No.: US 8,332,506 B2
(45) Date of Patent: Dec. 11, 2012

(54) NETWORK MONITOR PROGRAM EXECUTED IN A COMPUTER OF CLUSTER SYSTEM, INFORMATION PROCESSING METHOD AND COMPUTER

(75) Inventor: Takahiro Sayama, Toyama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/111,451

(22) Filed: Apr. 29, 2008

(65) Prior Publication Data

US 2008/0201470 A1    Aug. 21, 2008

Related U.S. Application Data

(63) Continuation of application No. PCT/JP2005/020708, filed on Nov. 11, 2005.

(51) Int. Cl.
*G06F 15/173* (2006.01)
*G06F 11/00* (2006.01)

(52) U.S. Cl. ............... 709/224; 714/4.11; 714/E11.026

(58) Field of Classification Search ................... None
See application file for complete search history.

(56) References Cited

U.S. PATENT DOCUMENTS

| 5,742,851 | A | 4/1998 | Sekine |
| 7,752,486 | B2 * | 7/2010 | Satran et al. ................. 714/4 |
| 2005/0050398 | A1 * | 3/2005 | Rao et al. ................... 714/39 |

FOREIGN PATENT DOCUMENTS

| JP | A 4-291628 | 10/1992 |
| JP | A 9-81407 | 3/1997 |
| JP | A 11-338725 | 12/1999 |

* cited by examiner

*Primary Examiner* — Wen-Tai Lin
(74) *Attorney, Agent, or Firm* — Greer, Burns & Crain, Ltd.

(57) ABSTRACT

A network monitor program operating in each node included in a cluster system, for causing the node to execute: when a response to an existence confirmation message from a relay apparatus, which relays a business request to the node, could not be received, obtaining status data of other nodes included in the cluster system; when the status data of the other nodes represents that one of the other nodes is in a usable state, confirming whether or not the node in the usable state can communicate with the relay apparatus; and when it is confirmed that the node in the usable state can communicate with the relay apparatus, notifying a cluster manager of an occurrence of a communication failure.

8 Claims, 3 Drawing Sheets

NETWORK MONITOR PROGRAM EXECUTED IN A COMPUTER OF CLUSTER SYSTEM, INFORMATION PROCESSING METHOD AND COMPUTER

CROSS-REFERENCE TO RELATED APPLICATIONS

This application is a continuing application, filed under 35 U.S.C. section 111(a), of International Application PCT/JP2005/020708, filed Nov. 11, 2005.

TECHNICAL FIELD OF THE INVENTION

This invention relates to a failure management technique in a cluster system.

BACKGROUND OF THE INVENTION

In a cluster system including a cluster operation node and a cluster stand-by node, a network monitor executed in the cluster operation node periodically transmits an existence confirmation message to a network relay apparatus, which is connected with, for example, the Intranet or Internet and relays a job request from other computers connected with the Internet or the like to the cluster operation node. When a transaction Local Area Network (LAN) between the network relay apparatus and the cluster operation node are normally functioning, the network relay apparatus replies a response to the existence confirmation message. However, when a communication failure occurs by a failure of a Network Interface Card (NIC) in the cluster operation node or the like, a failure of the network relay apparatus or the like, the response is not returned from the network relay apparatus. When no response can be obtained for the predetermined number of messages, from the network relay apparatus, the network monitor notifies a cluster manager executed in the cluster operation node of an occurrence of the network failure. Then, after the cluster manager in the cluster operation node stops a business application being executed in the cluster operation node, it causes the network monitor to deactivate an inherited IP address in use. Next, the network monitor in the cluster stand-by node activates the inherited IP address in response to a request from the cluster manager in the cluster operation node, and activates the business application in the cluster stand-by node. Thereby, the subsequent business processing is inherited by the cluster stand-by node.

Incidentally, JP-A-H04-291628 discloses a technique for automatically recovering a failure when the failure occurs in a composite subsystem controller in a composite-subsystem-type online system. Specifically, a controller monitor, which detected a failure occurrence of the controller, instructs a hot stand-by start when a stand-by job exists. When there is no stand-by job, the controller is activated after stopping all subsystems under the controller, and after a state is returned from the latest check point and journal information obtained after the check point, up to a state where a processor in the execution system was downed, the processing proceeds. Thus, when the failure occurred in the composite subsystem controller, because of the temporary and time-based reason, not the hardware reason, the failure can be automatically recovered and the processing can proceed. However, the failure occurrence in the network cannot be treated.

In the aforementioned conventional art, when the network failure is notified to the cluster manager in the cluster stand-by node, the cluster stand-by node is abandoned after that, that is, it becomes inoperable state. This inoperable state is also notified to the cluster manager of the cluster operation node. After that, when the network failure is notified to the cluster manager in the cluster operation node, it is supposed that there is no switching destination node, and the node switching is not carried out. In the cluster operation node, the business application is stopped, and the inherited IP address is deactivated. Therefore, at that timing, the business processing is stopped. When the occurred failure is a failure in the NIC of the cluster operation node or cluster stand-by node or in the hardware of the network relay apparatus or the like, the aforementioned control is proper.

However, when the load of the network relay apparatus becomes high due to the increase of the communication traffic in the transaction LAN, a response may not be temporarily replied to the existence confirmation message from the network monitor, or the response may be delayed. In addition, there are some network relay apparatuses in which the priority is assigned to the traffic, and which, in case of the high load state, controls to discard the traffic having the low priority and to process only the traffic having the high priority. Then, such a network relay apparatus may not respond to the existence confirmation message. Thus, in a case where the congestion temporarily occurs in the transaction LAN, it is expected that the congestion recovers to the state that the communication can be done, after some time passes. On the other hand, when the occurrence of the network failure is detected by the network monitor in both of the cluster operation node and the cluster stand-by node and is notified to the cluster manager, (1) immediately after the switching from the cluster operation node to the cluster stand-by node, the failure is also detected by the cluster stand-by node and the business application is stopped. Or (2) because the failure is detected at the cluster stand-by node side, the cluster stand-by node is abandoned, and the business application in the cluster operation node is stopped without carrying out the node switching.

Thus, because both of the cluster operation node and cluster stand-by node become abnormal in the resource, there is a problem that the business processing cannot be recovered unless an operator operates the cluster manager in each node from a management console to reactivate the business application, even when the network is recovered after that. In addition, there are problems that, before the reactivation of the business application, it is necessary to collect data to investigate the reason why the stop of the business processing occurred and to carry out check operation to confirm whether or not the restart of the business processing can be carried out without any problem, and it takes time and job.

Thus, when the network failure temporarily occurs due to the increase of the communication traffic in the network, there is no guarantee of the business processing continuity even if, by the node switching, the business processing is inherited from the cluster operation node to the cluster stand-by node. In addition, when the maintenance operation such as update of the firmware in the network relay apparatus is carried out, because, also in case where an operation mistake that the reboot of the network relay apparatus is mistakenly carried out without stopping the monitor by the network monitor, both of the cluster operation node and the cluster stand-by node are stopped, a problem that it takes time and job for the reboot occurs.

Normally, the node switching control when a fatal error occurs in the application operating in the cluster system depends on that cluster system. When the error occurs, the network monitor merely notifies the cluster manager of the error, and it is not considered whether or not the business processing can continue in other nodes. In addition, although an interface (commands, Application Program Interface (API) or the like) to refer to the state of the application in each node and to judge whether or not the node has already been in the inoperable state is provided in the normal cluster system, it is impossible to correctly judge whether or not the business processing can continue in other nodes when the error is almost simultaneously detected in each node.

SUMMARY OF THE INVENTION

Therefore, an object of this invention is to provide a failure management technique not to cause the business processing interruption or stop as much as possible as a whole of the cluster system, when the network failure temporarily occurred.

An information processing method executed by a computer included in a cluster system according to this invention includes: when a response to an existence confirmation message from a relay apparatus, which relays a business request to the computer, cannot be received, obtaining status data of other computers included in the cluster system; if the status data of the other computers represents one of the other computers is in a usable state, confirming whether or not the computer in the usable state can communicate with the relay apparatus; and when it is confirmed that the computer in the usable state can communicate with the relay apparatus, notifying a cluster manager of an occurrence of a communication failure.

Thus, when it is confirmed that only its own computer detected the communication failure, the communication failure is notified to the cluster manager to, for example, switch the node. Then, it is possible to prevent both of the cluster operation node and the cluster stand-by node from shifting to the operation stop state and becoming the business processing interruption or stop. Incidentally, the confirmation in the confirming is carried out by using a route different from the network connected with the relay apparatus.

In addition, the information processing method may further include, when the status data of the other computers represents all of the other computers are in the unusable state, transmitting a second existence confirmation message to the relay apparatus, and waiting a response from the relay apparatus. In case where it is confirmed that all of the computers in the cluster system cannot communicate with the relay apparatus, there is possibility that the business processing by the entire cluster system is interrupted or stopped when its own computer is shifted to the inoperable state. Therefore, the existence confirmation is carried out again for the relay apparatus. Then, when the response can be received, it is possible to confirm that the temporary network failure occurred. Therefore, the state shifts to the normal state.

Furthermore, the information processing method may further include, when it is confirmed that all of the computers in the usable state cannot communicate with the relay apparatus, transmitting a second existence confirmation message to the relay apparatus, and waiting a response from the relay apparatus. That all of the computers in the usable state cannot communicate with the relay apparatus means that, even when its own computer is shifted to the inoperable state to switch the node, it is impossible to continue the business processing as a whole of the cluster system. Therefore, by carrying out the existence confirmation to the relay apparatus, it is confirmed whether or not the network failure is temporary. Then, when the response can be received, the state shifts to the normal state.

Incidentally, it is possible to create a program for causing a computer to execute the aforementioned information processing method according to the present invention. The program is stored into a storage medium or a storage device such as, for example, a flexible disk, a CD-ROM, a magneto-optical disk, a semiconductor memory, or a hard disk. In addition, the program may be distributed as digital signals over a network in some cases. Data under processing is temporarily stored in the storage device such as a computer memory.

DETAILED DESCRIPTION OF THE PREFERRED EMBODIMENTS

Figure 1:
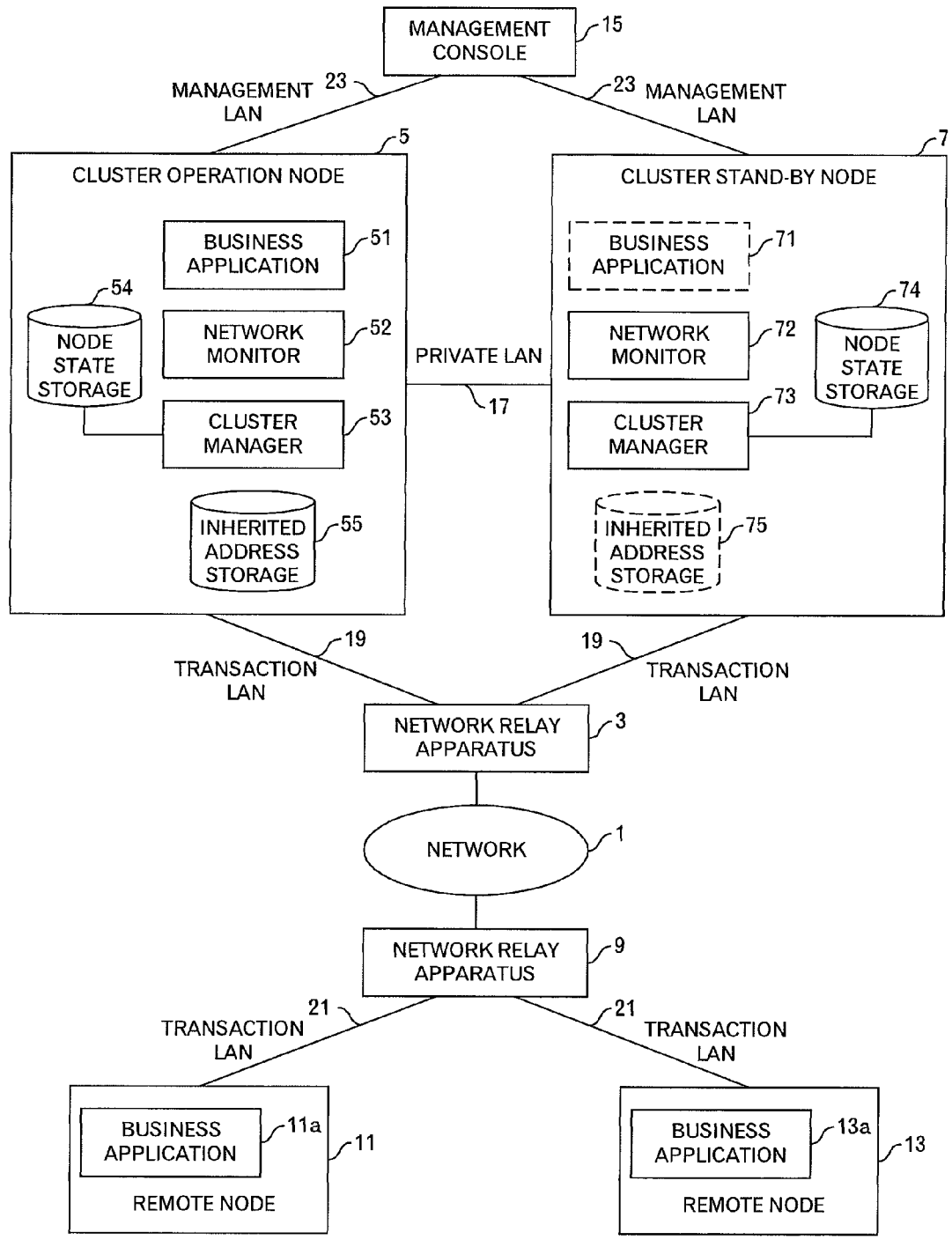
FIG. 1 is a functional block diagram in an embodiment of this invention.

FIG. 1 shows a functional block diagram in one embodiment of this invention. A network 1, which is the Internet or Intranet, is connected to network relay apparatuses 3 and 9 such as a router or switch. The network relay apparatus 3 is a connection device connecting the network 1 with the transaction Local Area Network (LAN) 19, and is connected with a cluster operation node 5, which is a computer that normally executes a business processing, and a cluster stand-by node 7, which is a computer that inherits the business processing of the cluster operation node 5 when a failure occurs in the cluster operation node 5. Although an example that the cluster system is composed of two computers of the cluster operation node 5 and the cluster stand-by node 7 is shown here, the cluster system may be composed of three or more computers. The cluster operation node 5 and the cluster stand-by node 7 are connected through a private LAN 17 each other. In the private LAN 17, an IP address, which is different from an inherited IP address described later, is assigned to each node, and it is possible to communicate by using this IP address. In addition, a management console 15, which is operated by an administrator of the cluster system, is connected with the cluster operation node 5 and the cluster stand-by node 7 through a management LAN 23. Furthermore, the network relay apparatus 9 is a connection device to connect the network 1 with the transaction LAN 21, and is connected with remote nodes 11 and 13 through the transaction LAN 21.

The cluster operation node 5 includes a business application 51 that is an application program operating on the cluster system and communicates by using the inherited IP address, a network monitor 52, a cluster manager 53, a node state storage 54 and an inherited address storage 55. In the cluster operation node 5, the business application 51, the network monitor 52 and the cluster manager 53 are activated. In addition, the cluster operation node 5 uses the inherited address stored in the inherited address storage 55 to communicate with other computers through the network 1 and the network relay apparatus 3.

On the other hand, the cluster stand-by node 7 includes a business application 71, a network monitor 72, a cluster manager 73, a node state storage 74 and an inherited address storage 75. Incidentally, because of the stand-by system, in the cluster stand-by node 7, only the network monitor 72 and the cluster manager 73 are activated. In addition, the inherited address is stored in the inherited address storage 75, but is not activated. Or, the inherited address is not stored in the inherited address storage 75.

The cluster managers 53 and 73 communicate each other through the private LAN 17 to control switching of the application operating in the cluster system, and store the states of the nodes constituting the cluster system into the node state storage 54 or 74. The network monitors 52 and 72 are application programs executed in each node on the cluster system, and monitor the communication state of the transaction LAN 19, and notfies the cluster manager 53 or 73 of the communication failure, when the communication failure is detected. In addition, in response to an instruction from the cluster manager 53 or 73, the network monitor carries out the activation or deactivation of the inherited address.

The remote nodes 11 and 13 execute the business application 11a or 13a, transmit a business request to the cluster operation node 5 of the cluster system, or the cluster stand-by node 7 according to circumstances, and receives a response from the cluster operation node 5 or cluster stand-by node 7. The business application 11a or 13a may be a Web browser, for example.

In this embodiment, an object is to prevent the entire cluster system from falling into the business processing interruption or stop state, by changing only the constitution of the network monitors 52 and 72, when the failure temporarily occurs in the transaction LAN 19. That is, the business applications 51 and 71, the cluster managers 53 and 73, the node state storages 54 and 74 and the inherited address storages 55 and 75 are not changed from the conventional ones.

Figure 2:
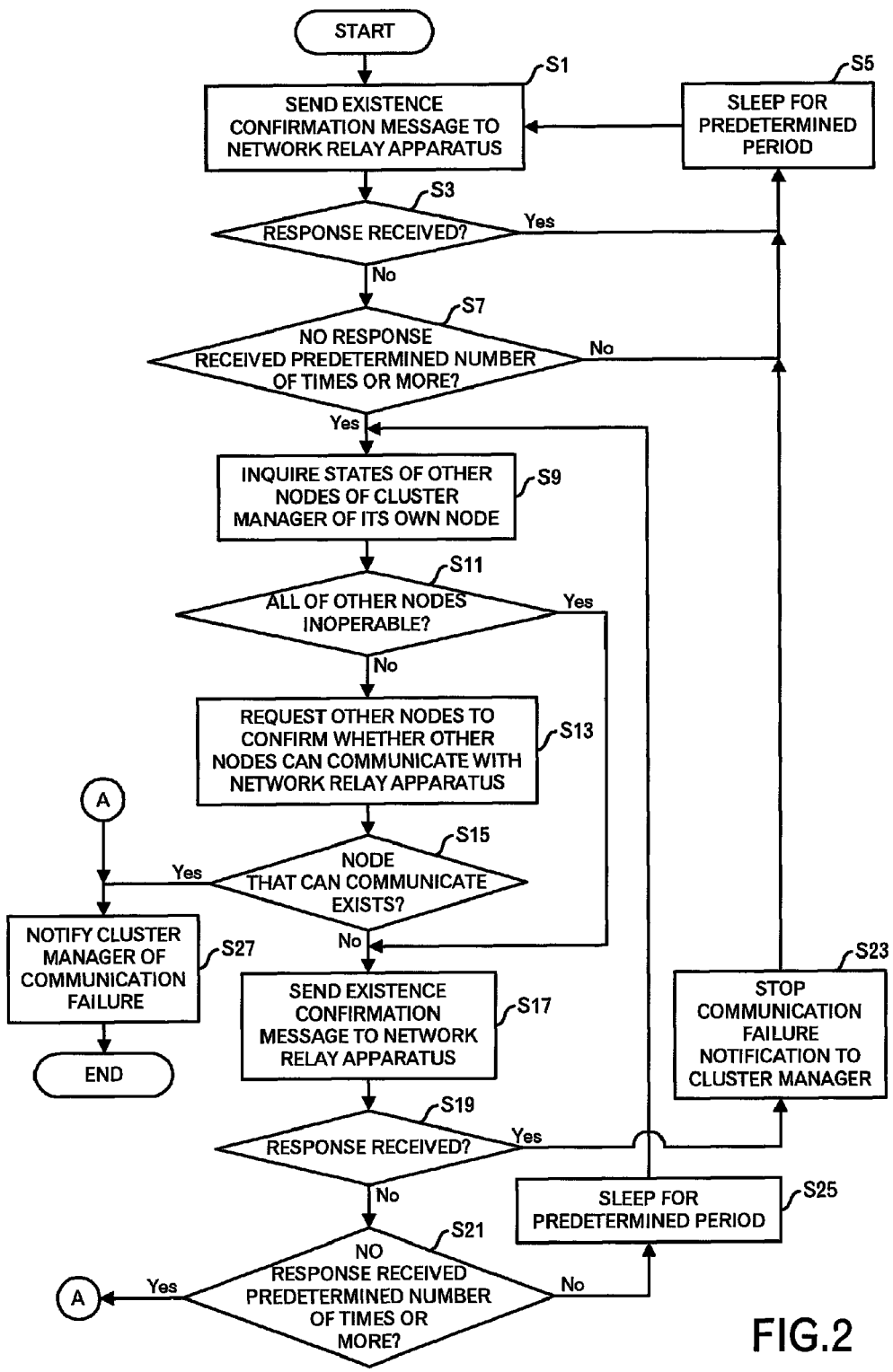
FIG. 2 is a diagram showing a processing flow of a network monitor.

Then, the operation of the network monitors 52 and 72 will be explained by using FIG. 2. Incidentally, in this embodiment, the operation of the network monitor 52 in the cluster operation node 5 and the operation of the network monitor 72 in the cluster stand-by node 7 are not different.

First, the network monitor (52 and 72. However, hereinafter, they are omitted.) transmits an existence confirmation message to the network relay apparatus 3 connected with the transaction LAN 19 (step S1). Internet Control Message Protocol (ICMP), which is one of TCP/IP protocols, can be used for the existence confirmation message. For instance, the ICMP Echo Request message is transmitted as the existence confirmation message.

Then, the network monitor judges whether or not a response was received from the network relay apparatus 3 within a first predetermined time period (step S3). When the response was received from the network relay apparatus 3 within the first predetermined time period, there is no problem. Therefore, the network monitor sleeps for a second predetermined time period (step S5), and the processing returns to the step S1 after that.

On the other hand, when the response was not received from the network relay apparatus 3 within the first predetermined time period, the network monitor judges whether the response is not received the predetermined number of times or more in a row (step S7). Although it is not shown in FIG. 2, a step of incrementing a counter by one between the step S3 and the step S7 and a step of clearing the value of the counter between the step S3 and the step S5 are executed, for example. When the number of times the response was not received does not reach the predetermined number of times, the processing shifts to the step S5. On the other hand, when the number of times the response was not received reaches the predetermined number of times, the network monitor inquires the states of other nodes from the cluster manager 53 or 73 of its own node after the counter is cleared because it is necessary to count the existence confirmation message again later (step S9). In response to this, the cluster manager 53 or 73 reads out data concerning the states (operating state/inoperable state or the like) of the other nodes, which are stored in the node state storage 54 or 74. The network monitor receives the data concerning the states of other nodes from the cluster manager 53 or 73, and judges whether or not all of the other nodes are in the inoperable state (step S11).

When all of the other nodes, which constitute the cluster system, are in the inoperable state, the processing shifts to the step S17 and the network monitor transmits the existence confirmation message to the network relay apparatus 3 connected with the transaction LAN 19 again, because the entire cluster system becomes inoperable and the business processing is interrupted or stopped when its own node becomes inoperable state. Then, the network monitor judges whether or not the response was received from the network relay apparatus 3 within the first predetermined time period (step S19). When the response was received from the network relay apparatus 3 within the first predetermined time period, it means that the failure temporarily occurred but is recovered now. Therefore, there is no special need to notify the cluster manager 53 or 73 of the failure. Accordingly, the network monitor stops communication failure notification to the cluster manager 53 or 73 (step S23), and the processing shifts to the step S5. That is, the state returns to the normal monitoring state. Thus, when the network failure temporarily occurred, it becomes possible to eliminate the useless transition to the inoperable state.

On the other hand, when the response was not received from the network relay apparatus 3 within the first predetermined time period, the network monitor judges again whether the response is not received the predetermined number of times or more (step S21). When the number of times the response was not received does not reach the predetermined number of times, the processing shifts to the step S25, the network monitor sleeps for a third predetermined time period, and then the processing returns to the step S9. Although it was described above, the counter may be incremented by one between the step S19 and the step S21, and the value of the counter may be cleared between the step S19 and the step S23. When the response was not received the predetermined number of times or more, the processing shifts to the step S27 through a terminal A, because it is considered that this failure is a network failure for a long term. However, the predetermined number of times may be different from the predetermined number of times at the step S7, and the infinite loop may be constituted, for example. That is, there is a case where the processing does not substantially shift to the step S27. In addition, the predetermined number of times may be changed depending on the cluster stand-by node 7 or the cluster operation node 5. For example, the number of times for the cluster operation node 5 may be greater.

In addition, when it is judged at the step S11 that there is an operable node, the network monitor confirms, for that operable node, whether or not the communication with the network relay apparatus 3 can be carried out from that operable node (step S13). As for this confirmation method, there are two methods as follows: one is a method for requesting the network monitor executed in that operable node through the private LAN 17 to transmit, for example, the existence confirmation message to the network relay apparatus 3, and the other is a method for directly controlling the operable node by the remote procedure call or the like through the private LAN 17 to cause the operable node to transmit the existence confirmation message to the network relay apparatus 3, for example. In case of the former method, the confirmation result is received from the network monitor of the operable node, and in case of the latter method, the network monitor itself can receive the confirmation result.

Then, the network monitor judges whether or not there is a node, which could communicate with the network relay apparatus 3, that is, could receive the response from the network relay apparatus 3 (step S15). When there is a node, which could communicate with the network relay apparatus 3, there is possibility that a failure occurs in its own node or a failure occurs in a port of the network relay apparatus 3, which is connected with its own node. Therefore, the processing shifts to the step S27.

On the other hand, when there is no node, which could communicate with the network relay apparatus 3, it is impossible to judge whether the reason is the failure of the network relay apparatus 3 or the temporal congestion of the network. Therefore, the processing shifts to the step S17, necessarily.

Because it is judged at the step S27 that there is a node that could communicate, the network monitor notifies the cluster manager of its own node of the occurrence of communication failure, when it can be judged that a failure associated with its own node occurred (step S15: Yes route), or when it is judged that a failure occurs in the network for a long term (step S21: Yes route).

When the communication failure is notified from the network monitor, the cluster manager carries out the normal operation. That is, when the network monitor 52 of the cluster operation node 5 notifies the cluster manager 53 of the occurrence of the communication failure, (1) the cluster manager stops the business application 51 of the cluster operation node 5, (2) the cluster manager 53 requests the network monitor 52 of the cluster operation node 5 to deactivate the inherited IP address, and the network monitor 52 deactivates the inherited IP address, (3) the cluster manager 53 requests the network monitor 72 of the cluster stand-by node 7 to activate the inherited IP address (e.g. transmits an activation request including the inherited IP address), and the network monitor 72 activates the inherited IP address (e.g. stores the inherited IP address into the inherited IP address storage 75, and sets it as an IP address in the transaction LAN 19), and (4) the business application 71 of the cluster stand-by node 7 is activated.

On the other hand, when the network monitor 72 of the cluster stand-by node 7 notified the cluster manager 73 of the occurrence of the communication failure, the state of the node is changed to the inoperable state, and the state is notified to the cluster managers of the other nodes.

By carrying out the aforementioned processing, unnecessary node switching due to the temporal increase of the communication load in the transaction LAN 19 or the operation mistake in the maintenance work and the transition of the cluster stand-by node 7 to the inoperable state can be suppressed. On the other hand, because it is possible to confirm that a failure occurred only in a specific node, the node switching or the transition to the inoperable state is immediately carried out similarly to the conventional case, when such a failure occurs.

Furthermore, when all of other nodes are in the inoperable state and a communication failure occurs, it becomes possible to inherit the business processing after waiting the recovery of the other nodes and to resume the business processing after waiting the recovery of the network failure.

Although one embodiment of this invention was explained, this invention is not limited to this embodiment. For example, database may be connected to the private LAN 17 to share it in the cluster system. In addition, the timing of the transition to the step S27 at the step 21 may be variously adjusted.

Figure 3:
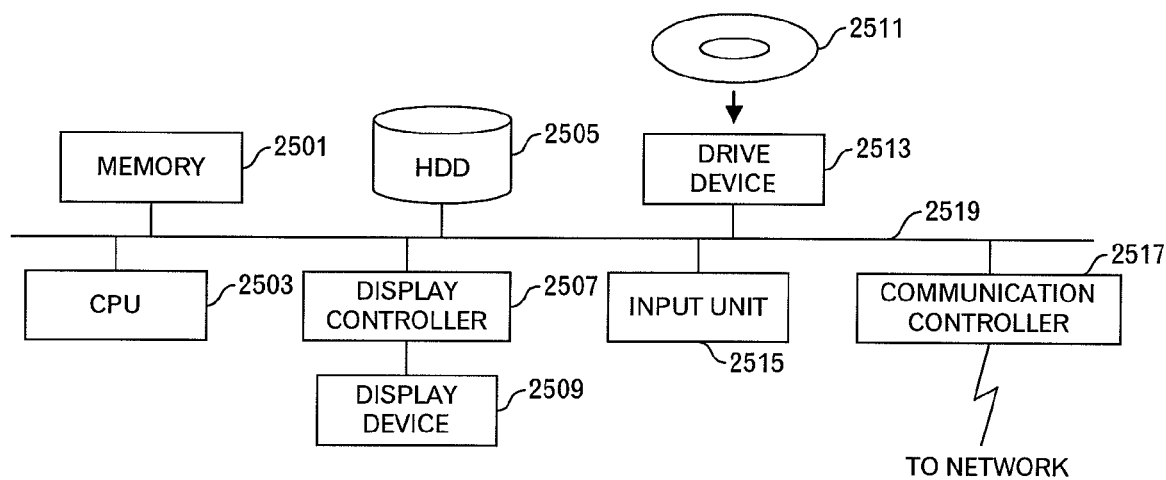
FIG. 3 is a functional block diagram of a computer device.

Incidentally, the aforementioned cluster operation node 5, cluster stand-by node 7, management console 15, and remote nodes 11 and 13 are computer devices as shown in FIG. 3. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 3. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized.

What is claimed is:

1. A computer-readable, non-transitory medium storing a network monitor program for causing a computer included in a cluster system to execute a network monitoring processing, said network monitor processing comprising:

after transmitting a first message to a relay apparatus, which is connected with other computers included in the cluster system and relays a request to said computer, and detecting that said computer did not receive a response to the first message from the relay apparatus, obtaining status data of said other computers included in said cluster system;

in response to detecting that said status data of said other computers represents that one of said other computers is in a usable state, causing, by said computer, said one of said other computers, which is in the usable state, to send a second message to said relay apparatus, and receiving, from said one of said other computers, a result representing whether or not said one of said other computers received a response to said second message sent by said one of said other computers from said relay apparatus; and in response to receiving, from said one of said other computers, said result representing that said one of said other computers received said response to said second message from said relay apparatus, notifying a cluster manager of an occurrence of a communication failure.

2. The computer-readable, non-transitory medium as set forth in claim 1, wherein said network monitor processing further comprises:

in response to detecting that said status data of said other computers represents that all of said other computers are in an unusable state, transmitting a third message to said relay apparatus, and waiting for a response from said relay apparatus; and in response to receipt of the response to the third message from said relay apparatus, terminating notification of the occurrence of the communication failure.

3. The computer-readable, non-transitory medium as set forth in claim 1, wherein said network monitor processing further comprises, in response to confirming that none of said other computers can communicate with said relay apparatus, transmitting a third message to said relay apparatus, and waiting for a response from said relay apparatus.

4. An information processing method, comprising:

after transmitting, by one computer included in a cluster system, a first message to a relay apparatus, which is connected with other computers included in a cluster system and relays a request to said computer, and detecting that the one computer included in the cluster system did not receive a response to the first message from the relay apparatus, obtaining, by said one computer, status data of said other computers included in said cluster system;

in response to detecting that said status data of said other computers represents that one of said other computers is in a usable state, causing, by said one computer, said one of said other computers, which is in the usable state, to send a second message to said relay apparatus, and receiving, by said one computer, from said one of said other computers, a result representing whether or not said one of said other computers received a response to said second message sent by said one of said other computers, from said relay apparatus; and in response to receiving, from said one of said other computers, said result representing that said one of said other computers received said response to said second message from said relay apparatus, notifying, by said one computer, a cluster manager of an occurrence of a communication failure.

5. The information processing method as set forth in claim 4, further comprising:

in response to detecting that said status data of said other computers represents that all of said other computers in an unusable state, transmitting, by said one computer, a third message to said relay apparatus, and waiting for a response from said relay apparatus; and in response to receipt of the response to the third message from said relay apparatus, terminating, by the one computer, notification of the occurrence of the communication failure.

6. The information processing method as set forth in claim 4, further comprising, in response to confirming that none of said other computers can communicate with said relay apparatus, transmitting, by said one computer, a third message to said relay apparatus, and waiting for a response from said relay apparatus.

7. A computer included in a cluster system, said computer comprising:

a memory;
a network monitor; and
a cluster manager, and
wherein said network monitor is configured to execute a procedure comprising:

after transmitting a first message to a relay apparatus, which is connected with other computers included in the cluster system and relays a request to said computer, and detecting that said computer did not receive a response to the first message from the relay apparatus, obtaining status data of said other computers included in said cluster system;

in response to detecting that said status data of said other computers represents that one of said other computers is in a usable state, causing said one of said other computers to send a second message to said relay apparatus, and receiving, from said one of said other computers, a result representing whether or not said one of said other computers received a response to said second message sent by said one of said other computers, from said relay apparatus; and in response to receiving, from said one of said other computers, said result representing that said one of said other computers received said response to said second message from said relay apparatus, notifying said cluster manager of an occurrence of a communication failure.

8. A computer-readable, non-transitory medium storing a program that causes a computer in a cluster system including a plurality of computers to execute a procedure, said procedure comprising:

transmitting a message from said computer that handles transaction requested by a request message relayed by a relaying apparatus to said relaying apparatus;

in response to detecting that no reply to said message transmitted by said computer is received, causing another computer in the cluster system to transmit a message to said relaying apparatus; and in response to receipt of a message representing that said another computer received a reply to said message transmitted by said another computer to said relaying apparatus, from said another computer, causing said another computer to take over another transaction, said another transaction being requested by a request message relayed by said relaying apparatus.

* * * * *